United States Patent [19]
Ponthieu

[11] Patent Number: 5,506,180
[45] Date of Patent: Apr. 9, 1996

[54] THERMALLY STABLE, CHEMICALLY RESISTANT GLASS COMPOSITION

[75] Inventor: Christine Ponthieu, Paris, France

[73] Assignee: Saint-Gobain Vitrage International, Courbevoie, France

[21] Appl. No.: 285,775

[22] Filed: Aug. 4, 1994

Related U.S. Application Data

[63] Continuation of Ser. No. 81,173, Jun. 25, 1993, abandoned.

[30] Foreign Application Priority Data

Jun. 25, 1992 [FR] France ................................. 92 07778

[51] Int. Cl.$^6$ .......................... C03C 3/091; C03C 3/087; C03C 3/078
[52] U.S. Cl. .................. 501/66; 501/70; 501/72
[58] Field of Search ................... 501/66, 70, 72

[56] References Cited

U.S. PATENT DOCUMENTS

| | | | |
|---|---|---|---|
| 3,496,401 | 12/1965 | Dumbaugh, Jr. et al. | |
| 3,904,423 | 9/1975 | Guthrie | 501/66 X |
| 4,316,963 | 2/1982 | Hommel et al. | 501/66 X |
| 4,824,808 | 4/1989 | Dumbaugh, Jr. | 501/66 |
| 4,994,415 | 2/1991 | Imai et al. | 501/66 |
| 5,116,787 | 5/1992 | Dumbaugh, Jr. | 501/66 |
| 5,116,788 | 5/1992 | Dumbaugh, Jr. | 501/66 |
| 5,116,789 | 5/1992 | Dumbaugh, Jr. | 501/66 |
| 5,244,847 | 9/1993 | Kushitani et al. | 501/66 |
| 5,348,916 | 9/1994 | Kushitani et al. | 501/66 |
| 5,374,595 | 12/1994 | Dumbaugh, Jr. et al. | 501/66 |

FOREIGN PATENT DOCUMENTS

| | | |
|---|---|---|
| 0316089 | 5/1989 | European Pat. Off. . |
| 0526272 | 2/1993 | European Pat. Off. . |
| 2675795 | 10/1992 | France . |
| 8902877 | 9/1988 | WIPO . |

OTHER PUBLICATIONS

Chemical Abstracts, vol. 117, No. 22, 30 Nov. 1992, Columbus, Ohio, US; abstract No. 218471k, p. 407.
Chemical Abstracts, vol. 117, No. 18, Nov. 2, 1992, Columbus, Ohio, US; abstract No. 176879s, p. 345.
Derwent Publications Ltd., London, GB; 91 JP-125165 (Nippon Sheet Glass Co Ltd) Alkali-free glass with good thermal and chemical resistance—used for semiconductor substrates Apr. 1991.
Chemical Abstracts, vol. 113, No. 14, 1 Oct. 1990 Columbus, Ohio US; Abstract No. 119822m. p. 188.
Chemical Abstracts, vol. 90, No. 26, 25 Jun. 1979, Columbus, Ohio US; abstract No. 208890f, p. 312.
Database WPI, Section Ch. Week 7535, 1975 Derwent Publications Ltd., London, GB; Class L, AN 75-58024W & JP-A-50 022 568 (Asahi Glass Co.) 31 Jul. 1975.

Primary Examiner—Mark L. Bell
Assistant Examiner—David Sample
Attorney, Agent, or Firm—Oblon, Spivak, McClelland, Maier, & Neustadt

[57] ABSTRACT

The present invention relates to a thermally stable, chemically resistant glass composition incorporating the following constituents within the ranges given hereinafter as cationic percentages:

| | |
|---|---|
| $SiO_2$ | 46 to 56% |
| $Al_2O_3$ | 12 to 17% |
| $B_2O_3$ | 10 to 23% |
| CaO | 9 to 15% |
| MgO | 0.5 to 4% |
| SrO | 2 to 7% |
| BaO | 0 to 4% |
| $Na_2O + K_2O$ | $\leq 0.5\%$ |
| $TiO_2$ | 0 to 3% |

The glass composition can be used for producing containers, fire-proof glazings or substrates for the electronics industry.

6 Claims, No Drawings

THERMALLY STABLE, CHEMICALLY RESISTANT GLASS COMPOSITION

This application is a Continuation of application Ser. No. 08/081,173, filed on Jun. 25, 1993, now abandoned.

BACKGROUND OF THE INVENTION

1. Field of the Invention

The present invention relates to a glass composition having a high strain point, a low expansion coefficient, and good chemical resistance. The glass composition can be used for producing pharmaceutical bottles and feeding bottles, and for producing sheets which, when cut to the desired size and optionally polished or treated, can be used as elements for producing fire-proof glazings or substrates on which electrically active layers are deposited. Such layer-coated substrates are generally referred to as slabs in the electronics industry and may be used for forming display screens such as liquid crystal, plasma or light-emitting screens.

2. Discussion of the Background

Glass compositions possessing high physical stability during a temperature rise, and good chemical resistance are known. However, they generally belong to the large family of borosilicate glasses, and more specifically to aluminoborosilicate glasses incorporating alkaline earth oxides.

Glass compositions which are transformed into sheets and then cut to serve as substrates are selected based upon their physicochemical properties. For example, a glass substrate upon which electrically active layers are to be deposited will be subjected to a number of operations during which the glass will achieve relatively high temperatures. The glass must not deform during these operations and must therefore have the highest possible strain point. Moreover, the thermal expansion coefficient of the glass forming the substrate must be compatible with that of the layers deposited thereon. Finally, the glass must not contain elements liable to migrate into the layers formed and lead to a deterioration of their properties, which is the case with alkalis.

The glass composition must have appropriate viscosity and devitrification characteristics consistent with the process chosen for obtaining a glass sheet to ensure that the thickness of the glass sheet is as uniform as possible and the surface of the glass sheet is as regular as possible. The glass composition must also have good chemical resistance to acid media, including hydrofluoric acid-based solutions.

A process which can be used for producing glass sheets consists of introducing a molten glass composition into an apparatus in which the top of the side walls, which converge downward, serve as a spout. The glass flows along the side walls, thus forming two streams which join at the top or tip of the apparatus, before being drawn vertically from top to bottom in the form of a planar sheet. Such a process requires that the glass has, at the liquidus temperature, a viscosity of at least 2 to $3 \times 10^5$ poise. Such a glass composition is described in U.S. Pat. No. 4,824,808.

Another process consists of spraying molten glass onto a metallic tin bath in accordance with the float glass process. Glass compositions which can be floated and which are to serve as substrates for forming flat screens are described in WO 89/02877.

However, these glass compositions belong to the family of aluminoborosilicates having a high alkaline earth oxide content. Although these glass compositions have good physicochemical characteristics, they contain high percentages of onerous oxides such as $B_2O_3$, SrO and BaO. In addition, they are relatively viscous for the float glass process compared with the glass compositions used in the examples illustrated in this application. Thus, the temperature corresponding to log $\eta=4$ is equal to or higher than 1150° C. or even 1200° C. The temperature corresponding to the same viscosity for an ordinary float glass (soda-lime-silica glass) is between 1000° and 1050° C.

A glass composition which can be formed by the float glass process is described in French patent application 91.08201, filed on Jul. 2, 1991. However, this glass composition is characterized by a low viscosity at a high temperature. The temperature of the glass corresponding to log $\eta=3.5$ is generally below 1180° C. In addition, this glass composition has a very low maximum devitrification rate. The low devitrification rate makes it possible to avoid the formation of crystals as the glass is produced despite the fact that the liquidus temperature may reach 1230° C.

SUMMARY OF THE INVENTION

Accordingly, one object of this invention is to provide a novel glass composition which can be floated and which has the physicochemical characteristics required for fire-proof glazings or for active matrix screen substrates at a low cost.

Another object of this invention is to provide a novel zinc oxide-free glass composition which can be sprayed onto the surface of a tin bath at particularly low temperatures, wherein the liquidus temperature of the glass composition remains below its temperature corresponding to the characteristic viscosity of log $\eta=3.5$.

Another object of this invention is to provide a novel glass composition incorporating a limited amount of onerous constituents.

Another object of this invention is to provide a novel glass composition for use in making containers resistant to thermal shocks.

These and further objects are achieved by a glass composition incorporating the following constituents within the ranges given hereinafter in cationic percentages:

| | |
|---|---|
| $SiO_2$ | 46 to 56% |
| $Al_2O_3$ | 12 to 17% |
| $B_2O_3$ | 10 to 23% |
| CaO | 9 to 15% |
| MgO | 0.5 to 4% |
| SrO | 2 to 7% |
| BaO | 0 to 4% |
| $Na_2O + K_2O$ | <0.5% |
| $TiO_2$ | 0 to 3% |

DETAILED DESCRIPTION OF THE PREFERRED EMBODIMENTS $SiO_2$ (silica) is one of the oxides forming the glassy network in the glass composition, and functions to preserve the stability thereof. When the cationic percentage of silica is below 46%, the chemical resistance of the glass can only be maintained by increasing the $B_2O_3$ percentage which is not desirable because of its expense. When the cationic percentage of silica exceeds 56%, it becomes difficult to melt the vitrifiable mixture and the viscosity of the glass increases making its refining and spraying on a tin bath difficult.

B$_2$O$_3$ functions to preserve the stability of the glass composition. B$_2$O$_3$ improves the chemical resistance of the glass composition, decreases the viscosity at high temperatures, and decreases the melting point of the vitrifiable mixture. B$_2$O$_3$ also reduces the capacity of the glass to devitrify. If present in excess of 23%, the influence of B$_2$O$_3$ decreases, and a high content thereof has the effect of reducing the strain point. If present below 10%, devitrification of the glass is increased, as is its viscosity.

Alumina also has a stabilizing function. Alumina increases the strain point and, to a certain extent, increases the chemical resistance of the glass composition. If present below 12%, the chemical resistance becomes inadequate. If present in excess of 17%, the glass composition is more difficult to melt and its viscosity at high temperatures increases excessively. Moreover, the chemical resistance undesirably decreases.

Alkaline earth oxides are very important constituents in the glass composition because they enhance melting and decrease viscosity at high temperatures.

CaO (lime) has the effect of straightening the viscosity curve for the glass composition, unlike other constituents which shift the viscosity curve to higher or lower temperatures. As a result, the temperature difference corresponding to two given viscosities is lower for the glass composition according to the invention than for ordinary soda-lime-silica glass.

This phenomenon has the effect of maintaining or increasing the strain point, facilitating the melting of the vitrifiable mixture and the refining of the glass obtained, and of reducing the temperature at which the glass can be sprayed on the surface of a tin bath. In order to obtain a significant straightening of the viscosity curve, a CaO content of approximately 9% is necessary. However, if CaO is present in excess of 15%, the expansion coefficient increases to an unacceptable level. Another advantage is that the glass composition, which is relatively rich in CaO, has a reasonable cost because CaO constituent is obtained from inexpensive starting materials. This economic advantage is even more marked in the case of the most CaO rich glass composition whose B$_2$O$_3$ content is reduced.

Magnesia increases the chemical resistance of the glass composition and decreases its expansion coefficient. It also reduces its viscosity at high temperatures. However, an upper MgO content level is limited to 4% as excess MgO increases the devitrification tendency of the glass composition.

SrO and, optionally, BaO reduce the viscosity of the glass composition at high temperatures. These oxides also reduce devitrification risks. In addition, SrO straightens the viscosity curve, but to a lesser degree than CaO. SrO is included in an amount of up to a content of approximately 7%, as a cationic percentage, without leading to an excessive rise of the expansion coefficient. BaO can optionally be introduced into the glass composition in relatively small amounts. BaO reduces the viscosity and 10 relatively significantly increases the expansion coefficient of the glass composition. However, it has no influence on the gradient of the viscosity curve and the starting materials supplying it are expensive.

The glass composition can incorporate other constituents in a limited quantity such as TiO$_2$, which has the effect of increasing chemical resistance.

In order to prevent the migration of elements into the layer covering the surface of a substrate constituted by a glass sheet, the glass composition contains very little or no alkali oxides. The maximum alkali oxide content is approximately 0.5%, as a cationic percentage.

As a result of the combined action of the different constituents described hereinbefore, the glass composition according to this invention can be easily melted and floated on a tin bath.

These advantages can be quantified by taking into consideration the measured difference between two temperatures corresponding to two given viscosities such as log η=4.5 and log η=2.5. This difference in the case of a conventional soda-lime-silica glass exceeds 330° C. In contrast, the same difference for glass compositions according to the invention is below 330° C., and for preferred compositions, the difference is below 300° C.

The glass compositions according to the invention are relatively easy to melt and easy to refine compared with other glass compositions developed for the same application. This provides reduced energy consumption during melting, and decreased wear of the refractories used to melt the glass composition.

The glass compositions according to the invention generally have a temperature corresponding to log η=4 which is equal to or below approximately 1140° C. This characteristic is important to the extent that the saturated vapor pressure of the tin becomes non-negligible at 1200° C. and rises rapidly at higher temperatures.

Finally, the glass compositions according to the invention have a temperature corresponding to log η=3.5 which exceeds their liquidus temperature. This makes it possible to obviate devitrification risks during the forming of the glass.

The glass compositions according to the invention generally have a strain point exceeding 610° C., an expansion coefficient below $50 \times 10^{-7}$/°C. and good resistance to hydrofluoric solutions.

Other features of the invention will become apparent in the course of the following descriptions of exemplary embodiments which are given for illustration of the invention and are not intended to be limiting thereof.

Examples 1 to 8 illustrate glass compositions according to the invention. Example 9 illustrates a glass composition outside the scope of the invention showing the influence of CaO content on the difference separating the temperatures corresponding to log η=4.5 and log η=2.5. The glass composition for each example and its physicochemical properties are presented in the table below.

The thermal characteristics, the devitrification and the viscosity of the glass compositions in the examples were measured according to known methods. Their chemical resistance was evaluated by measuring weight loss by a 15×30×6 mm glass plate, polished on its two faces, after spending time in an acid solution. The loss is expressed in mg/c$^2$. The resistance to hydrofluoric acid ($R_{HF}$) is measured after spending 7 hours at ambient temperature in an aqueous solution of hydrofluoric acid and ammonium fluoride. This solution is constituted by a 50% hydrofluoric acid solution and a 40% ammonium fluoride solution mixed in a weight ratio of 1 to 7.

The glass compositions according to the invention are produced from vitrifiable starting substances, certain of which are natural and which must have the minimum quantity of impurities.

The preferred glass composition is characterized by the following characteristics, considered singly or in combination:

SiO$_2$+Al$_2$O$_3$≦65%;

10%<CaO≦14%;

SrO+BaO≦4%; and $Na_2O<0.2\%$.

Using the float glass method, glass is produced in the form of a ribbon having a strictly controlled thickness. The ribbon is then cut to the desired size and optionally polished and treated, and used for forming fire-proof glazings or as substances for producing slabs.

The glass sheets produced according to the invention are characterized by a strain point exceeding 600° C. and an expansion coefficient below $50 \times 10^{-7}$° C. and are appropriate for the production of fire-proof glazings. Glass substrates produced according to the invention can be covered with layers based on Si, $SiO_x$, indium and tin oxides (ITO), or metals, in order to produce a fine array of thin film transistors. They can be covered with different layers making it possible to produce colored filters. Thus, for example, they can be covered with a film of Cr or NiCr, which is then etched by photolithography. A color layout (red, green, blue) is then obtained by the depositing of colors and photolithography. They are then covered by a polyimide layer and ITO. They can be covered with a series of layers, whereof at least one becomes luminescent under the effect of any electric discharge. The thus obtained slabs can be combined to form display screens, such as liquid crystal, plasma or light-emitting screens.

The glass compositions according to the invention make it possible to obtain containers, such as pharmaceutical bottles or feeding bottles requiring good resistance to thermal shocks and high chemical resistance to products contained therein. These containers can be obtained by the known procedure of blowing or pressing a blank into a mold.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermally stable, chemically resistant glass substrate consisting essentially of in ranges given herein after as cationic percentages:

| | |
|---|---|
| $SiO_2$ | 46 to 56% |
| $Al_2O_3$ | 12 to 17% |
| $B_2O_3$ | 10 to 23% |
| CaO | 9 to 15% |
| MgO | 0.5 to 4% |
| SrO | 2 to 7% |
| BaO | 0 to 4% |
| $Na_2O + K_2O$ | ≤0.5% |
| $TiO_2$ | 0 to 3% | and having a viscosity curve such that the difference between the temperatures corresponding to viscosities of log $\eta=4.5$ and log $\eta=2.5$ is <330° C.;

an expansion coefficient $\leq 50 \times 10^{-7}$/°C.;

a temperature corresponding to log $\eta=3.5$> the liquidus temperature; and a temperature corresponding to log $\eta=4 \leq 1140$° C.; and wherein said glass substrate is ZnO free.

2. The glass substrate according to claim 1, wherein the combined amount of $SiO_2$ and $Al_2O_3$ remains equal to or below 65%.

3. The glass substrate according to claim 1, wherein the CaO content is between 10 and 14%.

4. The glass substrate according to claim 1, wherein the combined amount of SrO and BaO is equal to or below 4%.

5. The glass substrate according to claim 1, wherein the $Na_2O$ content is below 0.2%.

6. The thermally stable, chemically resistant glass substrate of claim 1, wherein the difference between the temperatures corresponding to viscosities of log $\eta=4.5$ and log $\eta=2.5$ is <300° C.

TABLE

| | Ex. 1 | EX. 2 | Ex. 3 | EX. 4 | EX. 5 | EX. 6 | Ex. 7 | Ex. 8 | EX. 9 |
|---|---|---|---|---|---|---|---|---|---|
| $SiO_2$ | 48.30 | 46.98 | 46.66 | 46.99 | 49.43 | 47.36 | 47.85 | 46.84 | 52.35 |
| $Al_2O_3$ | 13.85 | 16.00 | 16.22 | 16.24 | 15.95 | 16.09 | 15.89 | 16.52 | 13.09 |
| CaO | 10.04 | 9.89 | 11.33 | 9.97 | 13.92 | 9.39 | 13.20 | 9.78 | 3.61 |
| MgO | 2.64 | 2.56 | 2.54 | 2.58 | 2.33 | 0.93 | 0.96 | 2.78 | 2.96 |
| SrO | 2.87 | 4.20 | 3.07 | 3.02 | 1.88 | 5.63 | 1.84 | 3.13 | 3.1 |
| BaO | 1.86 | | | 0.98 | | | | 1.71 | 5.05 |
| $B_2O_3$ | 20.44 | 20.31 | 20.11 | 20.16 | 16.50 | 20.61 | 20.26 | 19.05 | 19.85 |
| Strain Point (°C.) | 627 | 636 | 630 | 632 | 642 | 637 | 635 | 625 | 616 |
| Expansion Coefficient ($10^{-7}$/°C.) | 49.5 | 48.2 | 47.6 | 48.0 | 48.1 | 49.8 | 44.8 | 49.0 | 46.0 |
| Liquidus (°C.) | 1120 | | 1090 | | 1150 | 1060 | 1100 | 1100 | 1090 |
| Temp. log $\eta = 2$ (°C.) | 1441 | 1436 | 1435 | 1452 | 1457 | 1466 | 1459 | 1448 | 1573 |
| Temp. log $\eta = 3.5$ (°C.) | 1161 | 1170 | 1163 | 1174 | 1183 | 1183 | 1180 | 1175 | 1219 |
| Temp. log $\eta = 4$ (°C.) | 1097 | 1110 | 1101 | 1112 | 1120 | 1117 | 1116 | 1111 | 1140 |
| Temp. (log $\eta = 2.5$) − (log $\eta = 4.5$) (°C.) | 286 | 267 | 278 | 277 | 282 | 292 | 286 | 282 | 359 |
| $E_{HF}$ (mg/cm$^2$) | 13.25 | 9.24 | 8.45 | 16.22 | 11.34 | 7.88 | 8.89 | 8.36 | 10.07 |

* * * * *